(12) United States Patent
Ehmann et al.

(10) Patent No.: US 11,588,312 B2
(45) Date of Patent: Feb. 21, 2023

(54) WALL FEEDTHROUGH

(71) Applicant: ICOTEK PROJECT GMBH & CO. KG, Eschach (DE)

(72) Inventors: Bruno Ehmann, Mogglingen (DE); Valentin Ehmann, Schwabisch Gmund (DE)

(73) Assignee: ICOTEK PROJECT GMBH & CO. KG

( * ) Notice: Subject to any disclaimer, the term of this patent is extended or adjusted under 35 U.S.C. 154(b) by 0 days.

(21) Appl. No.: 17/053,570

(22) PCT Filed: Apr. 11, 2019

(86) PCT No.: PCT/EP2019/059179
§ 371 (c)(1),
(2) Date: Nov. 6, 2020

(87) PCT Pub. No.: WO2019/214894
PCT Pub. Date: Nov. 14, 2019

(65) Prior Publication Data
US 2021/0234349 A1    Jul. 29, 2021

(30) Foreign Application Priority Data
May 7, 2018    (DE) ............... 10 2018 207 019.9

(51) Int. Cl.
*H02G 3/22* (2006.01)
*H02G 3/08* (2006.01)
*H02G 15/013* (2006.01)

(52) U.S. Cl.
CPC ............... *H02G 3/22* (2013.01); *H02G 3/088* (2013.01); *H02G 15/013* (2013.01)

(58) Field of Classification Search
CPC ......... H02G 3/22; H02G 3/088; H02G 15/013
(Continued)

(56) References Cited

U.S. PATENT DOCUMENTS

| | | | | |
|---|---|---|---|---|
| 2,732,226 A | * | 1/1956 | N. Brattberg ............ | H02G 3/22 248/68.1 |
| 5,416,271 A | * | 5/1995 | Birmingham ............ | H02G 3/22 174/657 |

(Continued)

FOREIGN PATENT DOCUMENTS

| | | |
|---|---|---|
| DE | 10143678 | 2/2003 |
| DE | 10346742 | 2/2005 |

(Continued)

OTHER PUBLICATIONS

Durometer—Measures the hardness of rubbers (Year: 2014).*
(Continued)

*Primary Examiner* — Timothy J Thompson
*Assistant Examiner* — Michael F McAllister
(74) *Attorney, Agent, or Firm* — Faegre Drinker Biddle & Reath LLP

(57) ABSTRACT

The invention relates to a wall feedthrough having a frame which is divided by at least one intermediate web into at least two chambers, wherein at least one grommet of elastic material is arranged in each of the chambers, and wherein the grommet has at least one passage opening for accommodating an elongated object to be passed through the wall. It is provided according to the invention that two adjacent grommets, having an intermediate web between them, are respectively designed in such a way that they overlap the intermediate web on at least one side of the frame in the
(Continued)

longitudinal direction of the elongated objects over the entire height of one side edge of the grommet and make sealing contact with each other.

20 Claims, 4 Drawing Sheets

(58) Field of Classification Search
USPC .......................................... 174/650; 248/68.1
See application file for complete search history.

(56) References Cited

U.S. PATENT DOCUMENTS

| | | | | |
|---|---|---|---|---|
| 5,938,152 | A * | 8/1999 | Kreutz | H02G 3/22 |
| | | | | 277/630 |
| 7,806,374 | B1 * | 10/2010 | Ehmann | H02G 3/22 |
| | | | | 174/64 |
| 8,541,698 | B2 * | 9/2013 | Perschon | H02B 1/305 |
| | | | | 174/152 G |
| 8,963,010 | B2 | 2/2015 | Sprenger et al. | |
| 9,350,152 | B2 | 5/2016 | Thorsten et al. | |
| 9,765,908 | B2 * | 9/2017 | Andersson | F16L 5/14 |
| 2011/0114801 | A1 * | 5/2011 | Ehmann | H02G 3/083 |
| | | | | 248/68.1 |
| 2012/0280606 | A1 * | 11/2012 | Ehmann | H02B 1/305 |
| | | | | 312/351.1 |

FOREIGN PATENT DOCUMENTS

| | | |
|---|---|---|
| DE | 10347653 | 5/2005 |
| DE | 102005002879 | 8/2006 |
| DE | 102010037463 | 3/2012 |
| EP | 2323236 | 5/2011 |
| EP | 2746634 | 6/2014 |
| FR | 2990745 | 11/2013 |

OTHER PUBLICATIONS

Anonymous: "Shore durometer—Wikipedia, the free encyclopedia", Aug. 2, 2016 (Aug. 2, 2016), XP055294993, Gefunden im Internet: URL:https://en.wikipedia.org/w/index.php? title=Shore_durometer&printable=yes [gefu nden am Aug. 11, 2016 ], 5 pages.
International Preliminary Report on Patentability received for PCT Patent Application No. PCT/EP2019/059179, dated Nov. 19, 2020, 15 pages. (9 pages of English Translation and 6 pages of Original Document).
International Search Report and Written Opinion received for PCT Patent Application No. PCT/EP2019/059179, dated May 21, 2019, 19 pages. (9 pages of English Translation and 10 pages of Original Document).

* cited by examiner

WALL FEEDTHROUGH

CROSS-REFERENCE TO RELATED APPLICATIONS

The present application is a National Stage of International Application No. PCT/EP2019/059179, filed Apr. 11, 2019, which claims priority to DE 102018207019.9, filed May 7, 2018, the entire disclosures of which are hereby expressly incorporated herein by reference.

BACKGROUND/SUMMARY

The disclosure relates to a wall feedthrough having a frame and elastic grommets accommodated therein according to the type defined in more detail in the preamble of claim 1.

Wall feedthroughs for elongated objects, such as in particular cables, hoses, pipes or the like are known from the prior art. Using cable ducts as an example, EP 2 746 634 A2, EP 2 323 236 A1 or DE 103 47 653 A1 can be mentioned as the prior art. All these wall feedthroughs essentially have a frame with at least one intermediate web which divides the open area of the frame into at least two chambers. In the chambers, elastic grommets can be accommodated, which in turn have a passage opening for accommodating the elongated object such as a cable, a hose, a pipeline or the like. The elastic grommets then lie in a sealing manner against the elongated object and enclose it, so that the wall feedthrough can be designed in a completely sealed manner and is typically also capable of realizing strain relief for the elongated objects through the grommets, in that the elastic grommets lie positively and/or non-positively around the elongated object and are in turn held positively and/or non-positively in the frame or between a web of the frame and the at least one intermediate web.

It is the object of the present disclosure to further improve the sealing of such a wall feedthrough.

According to the disclosure, this object is solved by a wall feedthrough with the features in claim 1 and here in particular in the characterizing part of claim 1. Advantageous designs and further developments result from the subclaims that are dependent thereon.

The wall feedthrough according to the disclosure provides that two adjacent grommets (or sockets), with an intermediate web between them, are designed so that they overlap the intermediate web on at least one side of the frame in the longitudinal direction of the elongated object over the height of one side edge of the grommet and make sealing contact with each other.

This particularly advantageous configuration of the wall feedthrough according to the disclosure thus creates a contact between the elastic material of the grommets themselves. As a result, the intermediate web is completely covered so that it no longer has any direct influence on the seal. For this reason, intermediate webs with a non-sealed shape, for example intermediate webs formed in a truss construction, intermediate webs with threads or similar would be conceivable in principle. A very decisive advantage, regardless of the design of the intermediate web, is the fact that the grommets now touch each other, thus creating a seal between the grommets. This sealing between the elastic materials of the grommets enables a much better seal to be achieved than a seal between the mostly, but not necessarily, harder material of the intermediate web and the elastic material of the grommet. In particular, manufacturing tolerances that cannot be completely avoided in the production of the frame, the chambers and the intermediate webs can be better compensated for.

A further very decisive advantage of the grommets touching each other in an area where they overlap an intermediate web ultimately leads to the consequence that the entire wall feedthrough in the area of the grommets forms a single largely flat surface and that, in contrast to the structures shown in the prior art, no larger joints remain here. This is a very decisive advantage, in particular in hygiene-relevant applications, for example in the food processing industry, since the risk of dirt accumulating here is drastically reduced by dispensing with joints. At the same time, a very high degree of tightness can be achieved so that the now largely flat surface of the adjacent grommets can be cleaned easily and efficiently, for example with a high-pressure cleaner, a steam jet or similar.

In accordance with a very advantageous further development of the idea, it is provided that the grommets have corresponding profiles in the area of the sealing contact overlapping the intermediate web. Such corresponding profiles between the grommets or the end faces of the grommet projections overlapping the intermediate webs allow the sealing to be improved even further. In this case, the corresponding profiles can be designed in the form of a labyrinth seal, for example, to achieve an even higher level of sealing. Alternative variants would be, for example, the design in steps or as tongue and groove or, in particular, in the form of opposing bevels. On the one hand, such opposing bevels enable a good seal by additional overlapping of the material of one grommet with the material of the other grommet. For example, if both are beveled at a 30° angle, one bevel formed towards the rear completely overlaps the other bevel formed towards the front. This increases the area of contact between the grommets and further improves the seal. If, due to manufacturing tolerances in the frame and the intermediate webs, the grommets are slightly displaced during assembly in a direction transverse to the direction of passage of the elongated objects, such a bevel can largely prevent the formation of a critical joint in which dirt accumulates. The bevels also allow tolerance compensation beyond the elasticity of the grommet material.

A further design of the wall feedthrough according to the disclosure provides for the projection of the grommets, which partially overlaps the intermediate web, to lie flat against the intermediate web. By using the material of the intermediate web as a kind of carrier, this enables high mechanical strength, so that deformation, for example when using a high-pressure cleaner, is minimized, which leads to an improvement in sealing, in particular even without a corresponding profile.

Another very advantageous design of the idea provides further that the grommets overlap the frame on at least one of their sides in the longitudinal direction of the elongated objects by a certain distance, in order to ensure a very good seal in this case too and to avoid a groove running into the material in the longitudinal direction of the elongated objects. This also serves to improve the sealing and allows in particular high hygiene requirements to be met without any problems. In particular, the construction in this case is such that the side of the frame and the grommets, where the intermediate webs are covered by the overlapping grommet material, is the same side on which the grommet material also overlaps the frame by a certain distance.

In principle, it can be provided in this case to realize all this on only one side of the frame. An even further improvement in sealing can be achieved if this variant of sealing is achieved on both sides of the frame by overlapping sections of the grommets above the intermediate webs and the material of the grommets overlapping the frame by a distance on the side edge of the grommet facing away from the intermediate webs.

A very advantageous further development of the idea may alternatively or partially in addition thereto provide that the frame overlaps the grommets on at least one side of the frame in the longitudinal direction of the elongated objects by a certain distance. In this variant, it is therefore not the material of the grommet that overlaps the frame, but the frame is designed with a groove or profile groove for the grommet and overlaps the grommet. This also leads to a very good seal. Comparable to the grommet overlapping the frame, this can be realized on one or both sides of the frame in the longitudinal direction of the elongated objects. In principle, a combination of the structures is also conceivable, so that on one side of the frame in the longitudinal direction of the elongated objects the grommets overlap the frame by a distance and on the other side the frame overlaps the grommets. Another very advantageous design of the idea provides in this case that the grommets are realized in a form fit with the intermediate webs and the frame. They then hold in the longitudinal direction of the elongated objects not only by friction, but in particular also by a form fit, for example by a corresponding profile. On the one hand, this can increase the mechanical strength, so that the grommets can serve not only as a seal but also as a strain relief and, on the other hand, it can also improve the seal, since, in the manner of a labyrinth seal, each profile also always creates the possibility to increase the seal by multiple reversal of the direction of a potentially remaining gap.

As mentioned earlier, the frame can be made of a harder material than the grommets. However, it is also conceivable to use the same material for both, or in principle it would even be conceivable to make the grommets harder than the frame. In a preferred variant, however, the elasticity of the grommet can be relatively high, for example in the range of 30 to 70 Shore A, while that of the frame is lower in this case. The frame is therefore harder and therefore less elastic, for example with a hardness of more than 80 Shore A. In particular, the frame can be made of fiber-reinforced polyamide.

The passage opening in each of the grommets can be designed as a simple passage opening. It would be similarly conceivable, as is described in the prior art mentioned at the beginning, to provide a kind of pierceable membrane in the passage opening, so that the structure receives the passage opening only in the assembly of the elongated object at all, while unused grommets remain formed without passage opening and closed in themselves. A further possibility is also described in the prior art mentioned above. In this particularly preferred option, which is particularly suitable for pipes or cables with corresponding connecting elements such as flanges or plugs, it is provided in accordance with a very advantageous further development of the idea that each passage opening of each grommet is provided with a slot for unfolding the grommet. Such a slot allows the grommet to be unfolded so that even elongated objects that cannot be threaded through the opening because they carry, for example, plugs, flanges, hose connections or the like, can be inserted into the grommet during assembly. The grommet, which is unfolded during assembly, is then closed and pressed together when the frame is closed to realize a seal between the individual grommets and between the elongated object and the passage opening on the one hand and a seal between the two surfaces of the slot on the other. In this case, it is obvious that the slot does not have to be designed as a flat cut. Rather, it can be realized with a corresponding contour, for example in the form of a tongue and groove, in order to further improve the seal in the area of the slot.

BRIEF DESCRIPTION OF THE DRAWINGS

Further advantageous designs and additions can also be found in the exemplary embodiments, which are described in more detail below with reference to the figures, wherein.

DETAILED DESCRIPTION

Figure 1:
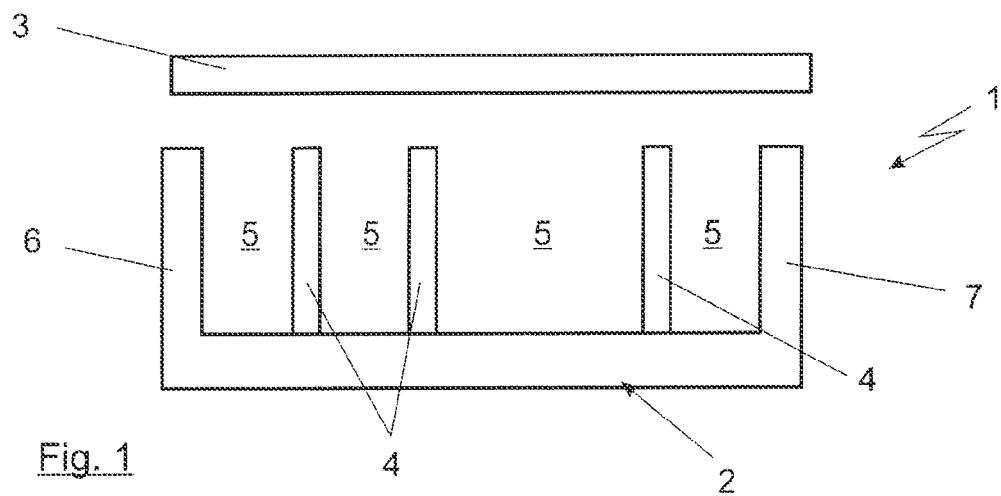
FIG. 1 shows the frame of a wall feedthrough in exploded view.

The illustration in FIG. 1 shows a possible frame 1 of a wall feedthrough not yet completed here. This frame consists of a U-shaped bottom part 2 and a frame cover 3. The frame cover 3, which is shown here in its unassembled state, can be connected to the frame bottom part 2, for example, by screwing, clipping or similar means. In the exemplary embodiment shown here, the space inside the frame is divided into different chambers, each marked here with reference numeral 5, by three intermediate webs 4 that are fixedly or detachably connected to the bottom part 2. The first chamber 5 from the left is located between one leg 6 of the U-shaped bottom part 2 and one of the intermediate webs 4. The two following chambers 5 are each located between two intermediate webs 4. The rightmost chamber 5 is again located between an intermediate web 4 and a second leg, marked with reference numeral 7, of the U-shaped frame bottom part 2. Grommets 8 made of an elastic material are now inserted into this chamber 5 from above. In the illustration in FIG. 2, the frame 1 is still open. However, it is equipped with several grommets 8, which will be discussed in detail later. For example, in the three narrower chambers 5, two of the grommets 8 are respectively arranged on top of each other, while in the large chamber 5, a single correspondingly larger grommet 8 is mounted. Alternatively, of course, more than two of the grommets 8 can be arranged one above the other if the height of the chamber 5 allows this. Another possibility is to use grommets 8 with several bores 9 within a single grommet 8 instead of the grommets 8 with one bore 9 or also grommets 8 without bore 9, which are then called blind grommets.

The cover 3 is now placed on the frame bottom part 2 to complete frame 1. In this case, the cover 3 is, for example, clipped to the frame bottom part 2 or screwed in the area of the legs 6, 7 of the bottom part 2. This assembled state can be seen in the illustration in FIG. 3. In addition, the original contour of the frame 1 and the intermediate webs 4, as also visible in FIG. 1, is indicated in a dotted line by overlapping material of the grommets 3. It can clearly be seen that there are only partially marked, overlapping projections 10 of the grommets 8, which, on the one hand, overlap the material of the frame 1 by a certain distance and thus ensure a good seal. On the other hand, the projections 10 of the grommets 8 touch each other in the area of the intermediate webs 4, so that an outwardly closed surface without significant joints is created by the elastic material of the grommets 8 overlapping the intermediate webs 4 and touching each other to ensure a tightness already between the grommets 8. The structure of the intermediate webs 4 in the illustration in FIG. 3 behind the overlapping areas of the grommets 8 then plays a subordinate role for the seal and the homogeneous, easy-to-clean surface.

Figure 4:
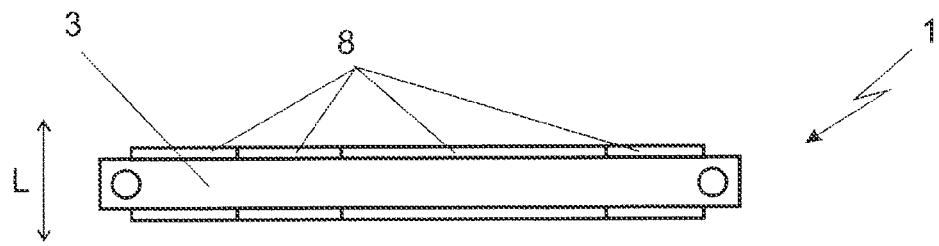
FIG. 4 shows a first embodiment variant of the wall feedthrough according to FIGS. 2 and 3 in the view from above.
Figure 5:
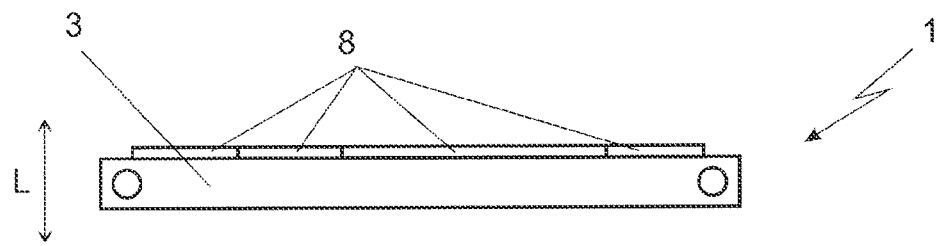
FIG. 5 shows a second embodiment variant of the wall feedthrough according to FIGS. 2 and 3 in view from above.

In the illustrations in FIGS. 4 and 5, two top views of possible embodiments can be seen. In FIG. 4 it can be seen that each of the grommets has 8 overlapping areas on both sides of the frame 1 in longitudinal direction L of the elongated objects passed through, such as cables. In the embodiment variant according to FIG. 5, the overlap and thus the homogeneous, well-sealing surface is only formed on one of the sides in longitudinal direction L of the elongated objects passed through.

The passed through elongated objects can, as already mentioned several times, be cables, lines, hoses or similar. In particular, the construction is to be described analogous to the prior art for cables mentioned at the beginning, in particular with cables with connectors, i.e. pre-assembled cables. However, it can be used just as well for pipelines, for example pipelines with attached flanges, hoses or the like.

Figure 2:
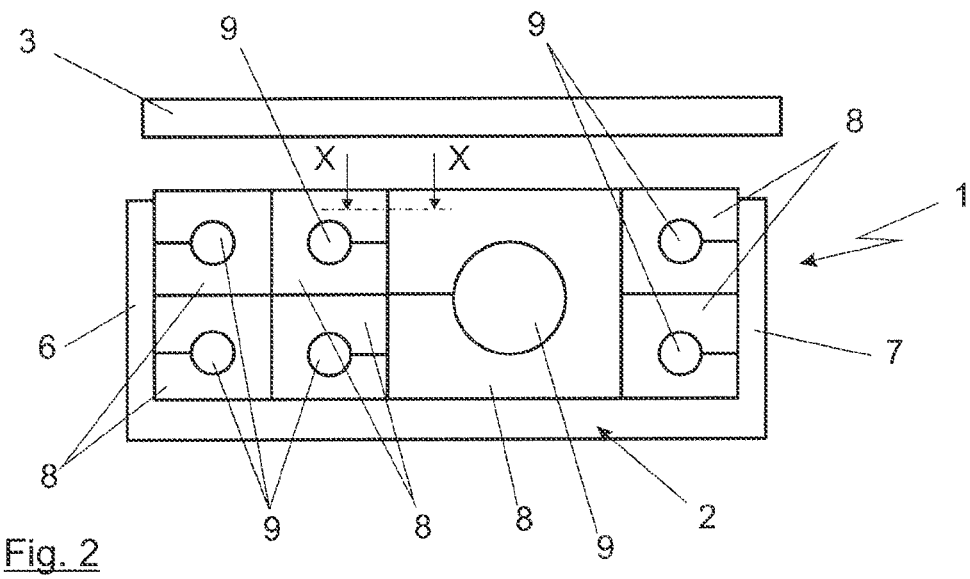
FIG. 2 shows a wall feedthrough according to the disclosure in a partially exploded view analogous to that in FIG. 1.
Figure 6:
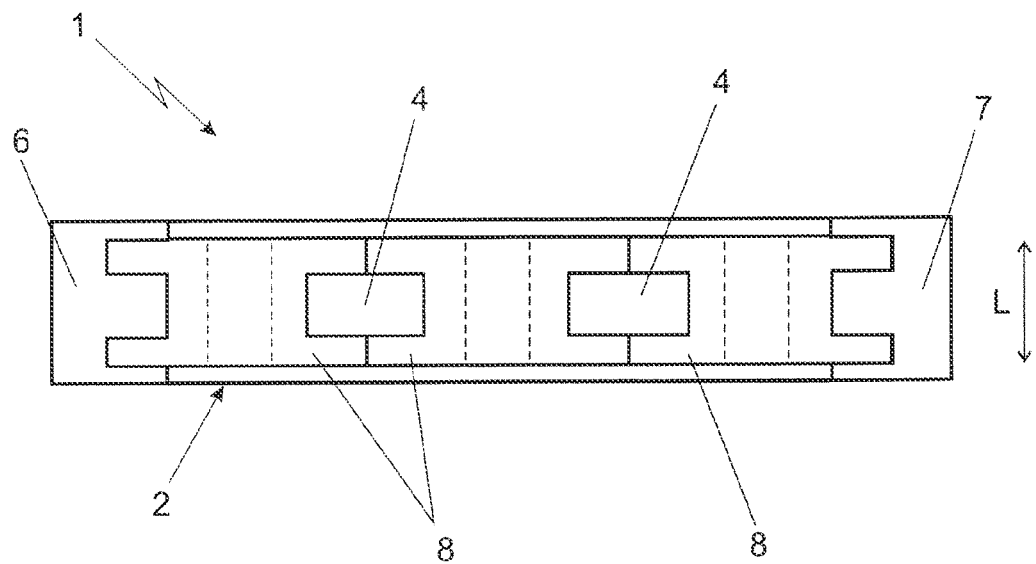
FIG. 6 shows a third embodiment variant of the wall feedthrough as seen from above with the cover removed.

The illustration in FIG. 6 shows another embodiment variant of the wall feedthrough 1, here with the cover 3 removed, i.e. essentially as shown in FIG. 2 from above. In this case, the alternative representation has only three chambers 5 of the same width. The grommets 8 overlap the intermediate webs 4 in the manner described in more detail below. The sealing between the grommets 8 and the frame 2 or its legs 6, 7 is now carried out differently than in the illustration in FIGS. 4 and 5 in such a way that the material of the frame 2 overlaps the grommet 8 in that a profile groove is arranged laterally in frame 2. This also leads to a very good sealing of the system of the wall feedthrough 1. This overlap of the frame 2 or its legs 6, 7 by the grommets 8 can be realized on both sides of the frame 2 in longitudinal direction L, as shown in FIG. 6. It could also be realized on one side only, as shown in FIG. 5. It would also be conceivable to realize an overlap of the grommets 8 over the frame 2 on one side as shown in FIG. 5 and an overlap of the frame 2 over the grommets 8 on the other side as shown in FIG. 6.

Figure 3:
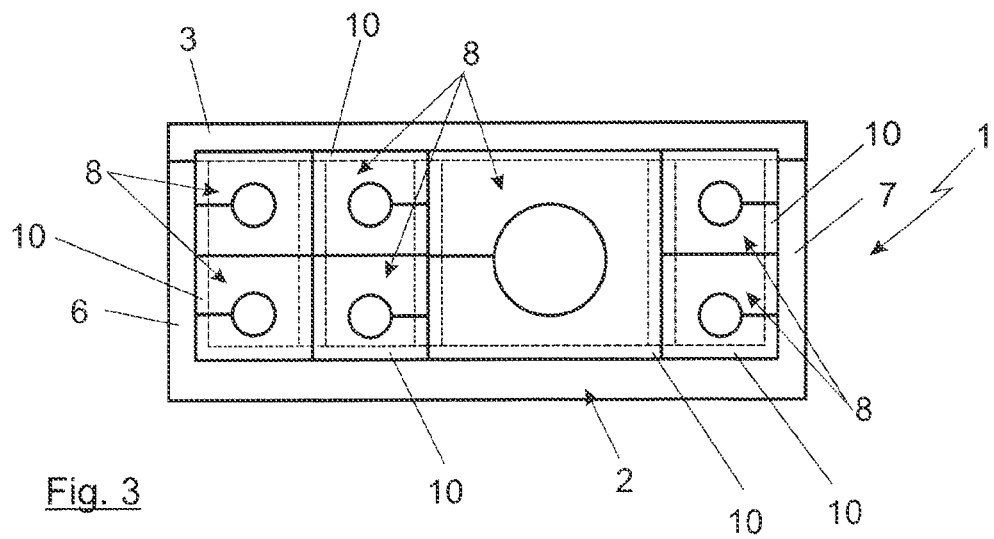
FIG. 3 shows a wall feedthrough according to the disclosure in mounted state.
Figure 7:
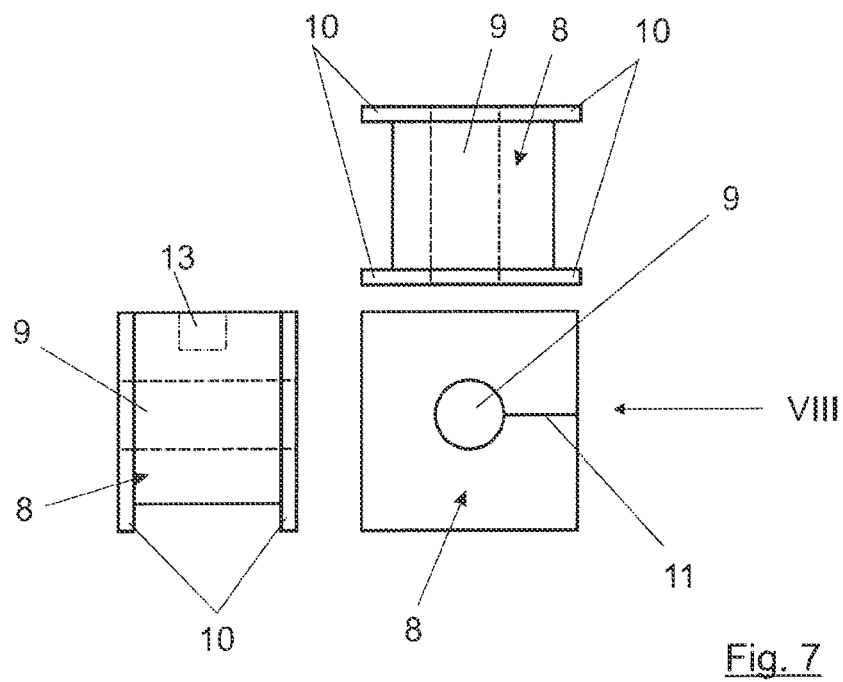
FIG. 7 shows three views of a possible grommet for a wall feedthrough according to the disclosure.

The illustration in FIG. 7 shows three views of one of the smaller grommets 8 from the illustration in FIGS. 2 and 3 as an example. Each of the grommets 8 has a through-hole in this case, which is marked with reference numeral 9 and is correspondingly drawn directly in the front view and with a dotted line in the two side views. The grommet 8 shown in FIG. 7 by way of example is to be used in this case for a configuration as shown in the illustration in FIG. 4. The grommet 8 has overlapping projections 10 on both sides of the frame 1 in the longitudinal direction of the cables or elongated objects that are passed through. In the side view from the left, these projections 10 are only formed downwards in this case and overlap the frame 1 or its U-shaped bottom part 2 by a certain distance. In the top view, the projections 10 are visible on both sides. If, for example, the grommet 8 is the grommet 8 shown in FIGS. 2 and 3 on the bottom right, the projections 10 disposed at the top right in the view would overlap the leg 7 of the U-shaped bottom part 2 of the frame, while the projections on the opposite side, i.e. on the left, overlap the intermediate frame 4 accordingly and are in contact with the projections of the larger grommet 8 over the entire height of the smaller grommet 8 to create a good seal and a largely closed surface. In the view from the left, the grommet 8 is shown flat at the top, in this case. This is the area in which the next grommet 8 is in contact accordingly, so that an accordingly good and tight fit is guaranteed by the exemplary flat design. An alternative here could be, for example, the design in the manner of a tongue and groove system or with a step or the like to further improve the seal between the two grommets 8 arranged one above the other in the one chamber 5. As an option, a groove 13 is indicated by way of example. The grommet 8 arranged above it would then have a corresponding tongue.

Figures 9, 10:
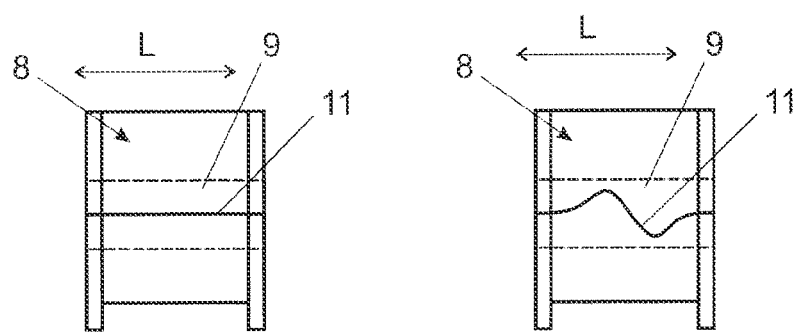
FIG. 9 shows a view of the grommet from FIG. 7 according to view VIII in a first embodiment.
FIG. 10 shows a view of the grommet from FIG. 7 according to view VIII in a second embodiment.

Furthermore, the illustration in FIG. 7 shows a slot 11 which connects the passage opening 9 with one of the side edges of the grommet 8. The grommet 8 can thus be unfolded, for example to accommodate a cable with a plug. The grommet 8 is then folded back around the cable; this results in a tight and, in particular, strain-relieving contact of the cable with the walls of the passage opening 9. Along the slot 11, the material of the grommet 8 lies on top of each other and is pressed together via the cover 3 when the frame 1 is closed so that a seal is also created. In the illustrations in FIGS. 9 and 10, this is shown as an example in a view VIII according to FIG. 7, once with a straight slot 11 in FIG. 9, which typically already provides a sufficient seal. In FIG. 10, also in view VIII according to FIG. 7, a variant with a selected slot 11 is shown, which allows an improved seal in longitudinal direction of the elongated objects or cables. As an alternative to the wave form, a step, a tongue and groove system or similar would also be conceivable.

Figure 8:
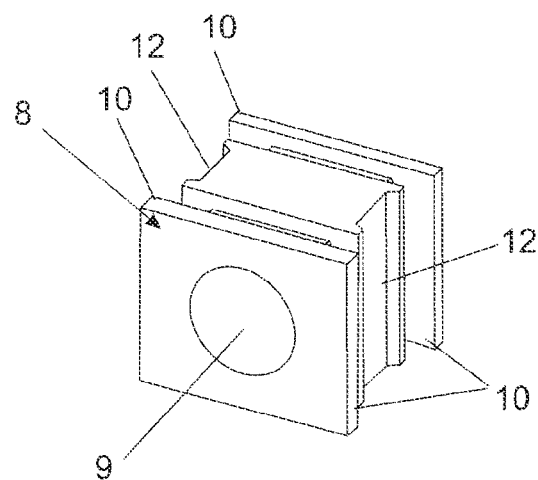
FIG. 8 shows a three-dimensional view of a possible embodiment of a grommet.

In the illustration in FIG. 8, a three-dimensional view shows another embodiment of the grommet 8. As an example, it dispenses with the slot 11. Furthermore, it has a contoured surface 12 in its edge area in the direction of the legs 6, 7 or intermediate webs 4, which on the one hand improves the seal and on the other hand allows the grommet 8 to be positively fitted between the legs 6, 7 and the intermediate webs 4.

Figure 11:
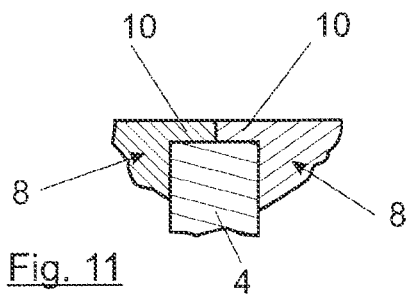
FIG. 11 to FIG. 15 show a principal view of different embodiment variants according to section X-X in FIG. 2.
Figure 12:
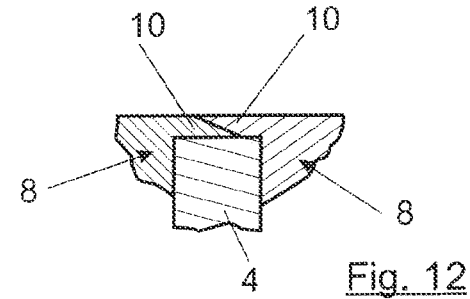
Figure 13:
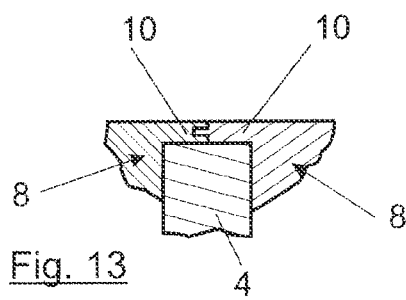
Figure 14:
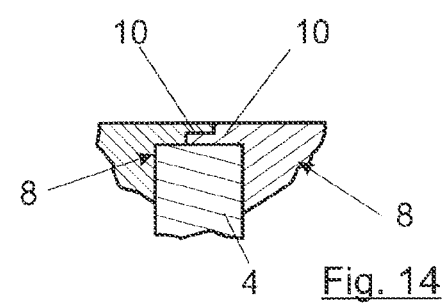
Figure 15:
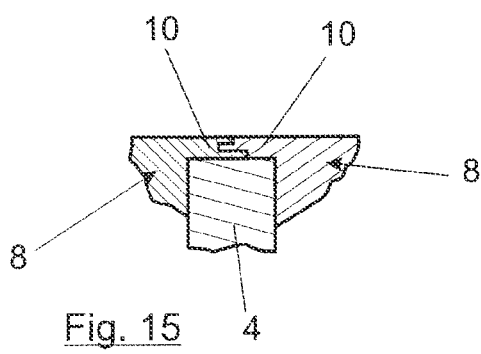

In the illustration in FIG. 11, a partial section according to the line X-X in FIG. 2 shows a variant for sealing two projections 10 of two adjacent grommets 8, which enclose an intermediate web 4 between them. In the illustration in FIG. 11, the separating line is constructed as a simple straight surface which, due to the elasticity of the material of the grommets 8, allows tolerance compensation and a safe and reliable sealing. In the illustration in FIG. 12, one of the projections 10 is designed with a bevel and the other with a corresponding mating bevel. This also provides a good seal, wherein the tolerance compensation in particular is improved if the intermediate webs 4 have a larger dimensional deviation, since a deep groove between the two components is prevented by the bevel in the event of a greater or lesser overlap of the projections 10. An alternative embodiment in the manner of a tongue and groove connection is shown in the illustration in FIG. 13, a simplified variant in the manner of a step in FIG. 14. FIG. 15 ultimately shows a very complex variant of a tongue and groove connection, which simultaneously acts in the manner of a labyrinth seal and can therefore further improve the seal. However, due to the size of the components and the thickness of the projections 10 which is often only a few millimeters, such a configuration is also correspondingly costly and complex to manufacture and assemble, so that it is only used if a very high tightness must be guaranteed in any case and/or larger components are used.

Figure 16:
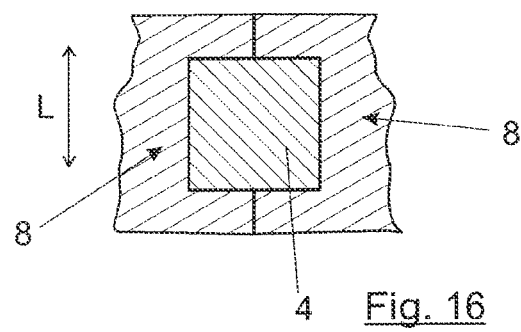
FIG. 16 to FIG. 18 show different design possibilities of intermediate webs in a section X-X in FIG. 2.
Figure 17:
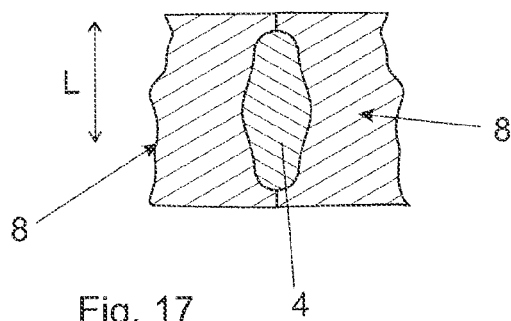
Figure 18:
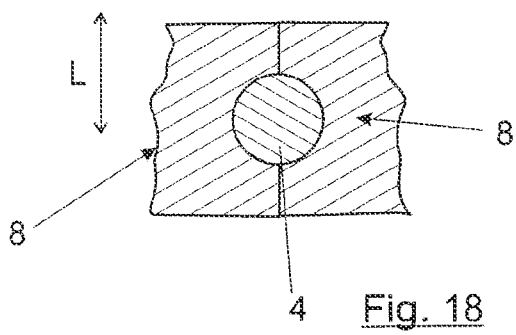

FIGS. 16 to 18 finally show different shapes of intermediate webs 4, again in a section, which is to be understood as a total section analogous to the lines X-X in FIG. 2. FIG. In this case, FIG. 16 shows the square or also rectangular intermediate web 4 between two of the grommets 8, as known from the previous figures. FIGS. 17 and 18 show, purely way of example, two alternative embodiments with a strongly rounded intermediate web 4 in the illustration in FIG. 17 and an exemplary round intermediate web 4 in the illustration in FIG. 18. These are just a few exemplary embodiments which can be combined with each other in various designs. It is understood that several intermediate webs 4 arranged one behind the other in the longitudinal direction L of the continuous elongated objects would also be conceivable, for example in the manner of two columns, in the manner of a truss or the like. Further alternatives are, for example, the use of screws or the like, which form the intermediate web on the one hand and a screw connection to close the frame 1 on the other hand. Due to the direct sealing between the materials of the two grommets 8 arranged around the intermediate web 4, the design of the intermediate web 4 is largely free so that it can also bear a thread, in particular in the case of the screws just mentioned, without adversely affecting the tightness of the structure. Other shapes are of course also conceivable. The different variants of grommets 8 with and without slot 11 can also be combined with each other.

The wall feedthrough can be used for various purposes. As already mentioned above, in particular for the passage of hoses, pipes or, particularly preferred, cables through a wall, in particular in a production or assembly plant where high demands are made on tightness and/or hygiene. In particular, the wall feedthrough should be designed screwed to the wall of a switch cabinet in the area of its frame 1 and close an opening in the wall of this switch cabinet. Cables can then be routed through the wall feedthrough into the interior of the switch cabinet without the risk of moisture penetrating into the interior of the switch cabinet, even if, for example, high-pressure jets and a correspondingly large amount of water and/or disinfectants or the like are used in production.

The invention claimed is:

1. Wall feedthrough having a frame which is divided by at least one intermediate web into at least two chambers, wherein at least one grommet of elastic material of a plurality of grommets is arranged in each of the chambers, and wherein each grommet of the plurality of grommets has at least one passage opening for accommodating an elongated object to be guided through a wall, wherein two adjacent grommets of the plurality of grommets, having an intermediate web between them, are respectively sized and shaped in such a way that they overlap the intermediate web between them on at least one side of the frame in the longitudinal direction of the elongated objects over the height of one side edge of the two adjacent grommets and make a sealing contact with each other.

2. Wall feedthrough according to claim 1, wherein the two adjacent grommets have corresponding profiles in an area of the sealing contact overlapping the intermediate web.

3. Wall feedthrough according to claim 2, wherein the corresponding profiles are designed as opposing bevels, steps and/or tongue and groove connection.

4. Wall feedthrough according to claim 2, wherein the corresponding profiles form a labyrinth seal.

5. Wall feedthrough according to claim 1, wherein the areas of the two adjacent grommets overlapping the intermediate web lie flat against the intermediate web.

6. Wall feedthrough according to claim 1, wherein each of the plurality of grommets overlap the frame on at least one side of the frame in the longitudinal direction of the elongated objects by a certain distance.

7. Wall feedthrough according to claim 1, wherein the frame overlaps each of the plurality of grommets on at least one side of the frame in the longitudinal direction of the elongated objects by a certain distance.

8. Wall feedthrough according to claim 1, wherein each of the plurality of grommets interact in a form-fitting manner with the intermediate webs and/or the frame.

9. Wall feedthrough according to claim 1, wherein each of the plurality of grommets are made of elastic material with a hardness of 30 to 70 Shore A.

10. Wall feedthrough according to claim 1 wherein the frame is made of a material with a hardness of at least 80 Shore A.

11. Wall feedthrough according to claim 1, wherein each passage opening in each of the plurality of grommets is provided with a slot for unfolding the grommet.

12. Wall feedthrough according to claim 3, wherein the corresponding profiles form a labyrinth seal.

13. Wall feedthrough according to claim 2, wherein the areas of the two adjacent grommets overlapping the intermediate web lie flat against the intermediate web.

14. Wall feedthrough according to claim 3, wherein the areas of the two adjacent grommets overlapping the intermediate web lie flat against the intermediate web.

15. Wall feedthrough according to claim 4, wherein the areas of the two adjacent grommets overlapping the intermediate web lie flat against the intermediate web.

16. Wall feedthrough according to claim 2, wherein each of the plurality of grommets overlap the frame on at least one side of the frame in the longitudinal direction of the elongated objects by a certain distance.

17. Wall feedthrough according to claim 3, wherein each of the plurality of grommets overlap the frame on at least one side of the frame in the longitudinal direction of the elongated objects by a certain distance.

18. Wall feedthrough according to claim 4, wherein each of the plurality of grommets overlap the frame on at least one side of the frame in the longitudinal direction of the elongated objects by a certain distance.

19. Wall feedthrough according to claim 5, wherein each of the plurality of grommets overlap the frame on at least one side of the frame in the longitudinal direction of the elongated objects by a certain distance.

20. Wall feedthrough according to claim 2, wherein the frame overlaps each of the plurality of grommets on at least one side of the frame in the longitudinal direction of the elongated objects by a certain distance.

* * * * *